US012812377B2

(12) United States Patent
Turina et al.

(10) Patent No.: US 12,812,377 B2
(45) Date of Patent: Nov. 24, 2026

(54) DATA SESSION SPECIFIC MONITORING

(71) Applicant: Telefonaktiebolaget LM Ericsson (publ), Stockholm (SE)

(72) Inventors: Klaus Turina, Herzogenrath (DE); Xiaowen Yue, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 19/129,669

(22) PCT Filed: Dec. 12, 2022

(86) PCT No.: PCT/EP2022/085349

§ 371 (c)(1),
(2) Date: May 14, 2025

(87) PCT Pub. No.: WO2024/125756

PCT Pub. Date: Jun. 20, 2024

(65) Prior Publication Data

US 2026/0197652 A1 Jul. 9, 2026

(51) Int. Cl.

| | |
|---|---|
| ***G06F 21/00*** | (2013.01) |
| ***H04W 12/088*** | (2021.01) |
| ***H04W 12/121*** | (2021.01) |
| ***H04W 12/67*** | (2021.01) |

(52) U.S. Cl.

CPC ....... *H04W 12/088* (2021.01); *H04W 12/121* (2021.01); *H04W 12/67* (2021.01)

(58) Field of Classification Search

CPC .. H04W 12/088; H04W 12/121; H04W 12/67
See application file for complete search history.

(56) References Cited

U.S. PATENT DOCUMENTS

| | | | | |
|---|---|---|---|---|
| 2018/0219917 | A1* | 8/2018 | Chiang | H04L 63/1433 |
| 2020/0259853 | A1* | 8/2020 | Alfano | H04L 43/0876 |
| 2021/0067560 | A1 | 3/2021 | Verma et al. | |
| 2021/0392477 | A1 | 12/2021 | Taft et al. | |

(Continued)

OTHER PUBLICATIONS

International Search Report and Written Opinion received for PCT/EP2022/085349 mailed on Jul. 5, 2023.

(Continued)

*Primary Examiner* — Michael M Lee
(74) *Attorney, Agent, or Firm* — Sonoda & Kobayashi Intellectual Property Law; Sarvajit S. Patil

(57) ABSTRACT

The application relates to a method for controlling detection of plurality of packet data sessions present in a user plane of a cellular network, including determining one or more types of possible security threats, network configuration data of the cellular network including a topology of the cellular network, and a security object to be applied to the plurality of packet data sessions. A detection profile is determined based on the determined information, the detection profile including at least one detection criterion indicating which of the plurality packet data sessions in the user plane should be monitored for what types of security threats and for which security object. The detection profile is transmitted to user plane entities, and a detection report is received from one of the user plane entities, and the detection report is further processed.

17 Claims, 7 Drawing Sheets

(56) References Cited

U.S. PATENT DOCUMENTS

| | | | | |
|---|---|---|---|---|
| 2022/0078619 | A1 | 3/2022 | Mahamkali | |
| 2022/0321607 | A1 * | 10/2022 | Peinado Gomez . | H04W 12/088 |
| 2023/0095715 | A1 * | 3/2023 | Srivastava .......... | H04W 12/121<br>726/23 |

OTHER PUBLICATIONS

František Strasák, "Detection of HTTPS Malware Traffic", Czech Technical University in Prague, Faculty of Electrical Engineering Department of Cybernetics, Bachelor Project Assignment, May 2017.

Paul Prasse et al. "Malware Detection by HTTPS Traffic Analysis", Mathematisch-Naturwissenschaftliche Fakultät, Universität Potsdam, 2016.

* cited by examiner

DATA SESSION SPECIFIC MONITORING

CROSS-REFERENCE TO RELATED APPLICATIONS

This patent application is a submission under 35 U.S.C. § 371 for U.S. national stage patent application of international application no. PCT/EP2022/085349 filed on Dec. 12, 2022 and entitled "DATA SESSION SPECIFIC MONITORING," the entirety of which is incorporated herein by reference.

TECHNICAL FIELD

The present application relates to a method carried out at a control entity configured to control a detection of plurality of packet data sessions present in a user plane of a cellular network, to a method carried out at a user plane entity configured to handle the plurality of packet data sessions. Furthermore, the corresponding control entity and user plane entity is provided. Additionally, a system comprising the control entity and the user plane entity, a computer program comprising program code and a carrier comprising the computer program is provided.

BACKGROUND

Nowadays the traffic in mobile network is dominated by web-based traffic characterized by UEs (User Equipment) accessing Internet servers. That is true for Mobile Broadband (MBB) traffic in public networks of Communication Service Providers (CSP) but this is also the dominant connectivity model for Non Public Networks (NPN) used for example for Mission Critical and/or industrial deployments.

FIG. 1 shows the traditional UE-Internet connection model for MBB traffic on a 3GPP NR Radio Access Network (RAN) with disaggregated gNB architecture using NR Dual-Connectivity via 2 gNBs.

A UE 10 connects to a master gNB, MgNB 20 and to a secondary radio access node 30, SgNB, where the AMF 40 is connected to the master gNB with the SMF 50 and UPF 60 being provided and the UPF being connected to the Internet 70. In the situation shown in FIG. 1 the UE can connect to services provided on the Internet. In the traditional MBB traffic model the traffic is mainly downlink dominated.

Generally the same connectivity model can be observed in the early adopters for industry use cases. As shown in FIG. 2 a robot or any device 15 uses the same connectivity to the master radio access node 20 and the secondary node 30. A difference is that in many cases in industrial deployments the data network, DN, is accessed on a local data center 80 residing on the industry facilities or campus, thus the user plane data flow is not leaving the company's area and propagation delay to a potential distant data center is eliminated. The device 15 such as the robot connects to control services on the company intranet. Dedicated application specific control protocols run over IP or Ethernet connection. Features known as routing behind UE allow multiple devices and sensors to access the network via one UE and therefore increase the attack surface. The traffic is not necessarily dominated by downlink traffic anymore and the limiting the packet delay is essential. Any compromised device 15 such as robot can be used to gain access to the industry's network. One option to overcome this problem is to place a security device such as intrusion detection, malware detection or firewall on the IT infrastructure connecting the N6 interface of FIG. 2 and potentially block traffic from the device in case of an anomaly. The increased security demand for many of these non-public networks, by way of example in an industrial environment, is taken care of by having appropriate security software running in the IT domain on the local data center 80. Accordingly, a compromised device sending malicious traffic can be identified and actions can be taken. One of the reasons for not placing the security software on the robot or device is that processing capacity on the devices is limited, and especially for non-stationary devices, the battery lifetime is crucial for industrial use cases.

However, with a communication model, moving away from the traditional UE-Internet model to direct UE-UE communication, securing the data flow by a security instance in the local data center is no longer possible. At the same time, the constraints on processing capability and battery lifetime on the UEs remain valid.

FIG. 3 shows a communication between two UEs such as the device 15 and device 16, wherein device 15 is connected to the master radio node 20 and the secondary radio node 30, whereas device 16 is connected to the master radio node 21 and the secondary radio node 31. Devices 15 and 16 could be served by the same radio access node as well. As shown in FIG. 3, in such a communication scenario the data flow between the devices 15 and 16 does not leave the mobile network and particularly it is not traversing the IT domain and hence any security software in the IT domain will not be able to detect malicious content and thus has no ability to detect a compromised device.

Existing security solutions do not have a fine-grained visibility to individually secure selected data flows such as PDU sessions or quality of service, QoS, flows. Existing solutions are either applied to all data flows of all users or in a more advanced case they are able to associate data flows with a specific user and apply security policies for all data flows of this user. This per UE granularity is considered as too coarse for future advanced functions and services because it does not consider attributes such as network slices, target domain names, or other industry specific attributes. Another example where more fine granular differentiation is needed is a case where multiple different devices using different types of services are hidden behind a UE serving as common access device. In that case there might be many flows that do not require detection but a few flows with higher security demands need to be identified. Without such fine granular differentiation the radio access network nodes need to unnecessarily spend more of the valuable processing capacity than needed on the security function limiting the overall performance of the radio access network node. This would lead to a less energy efficient implementation and would lead to higher cost per transported byte leading to the total higher costs of ownership.

SUMMARY

Accordingly, there is a need to overcome the above identified problems and to provide the possibility to implement a monitoring of data packet flows with a finer granularity.

This need is met by the features of the independent claims. Further aspects are described in the dependent claims.

According to a first aspect, a method is provided carried out at a control entity, which controls a detection of a plurality of packet data sessions, which are present in a user plane of a cellular network. The method comprises the step of determining one or more types of security threats. Furthermore, network configuration data of the cellular network is determined including a topology of the cellular network. A security object to be applied to the plurality of data sessions is determined and a detection profile is determined based on the determined one or more types of possible security threats, the security object and the network configuration data, wherein the detection profile includes at least one detection criterion indicating which of the plurality of packet data sessions in the user plane should be monitored for what type of security threats and for which security object e.g. for which of the plurality of packet data sessions. The determined detection profile is transmitted to the user plane entities in a radio access part of the cellular network and furthermore a detection report is received from at least one of the user plane entities generated in response to the transmitted detection profile, wherein the detection report reports at least one packet data session among the plurality of packet data sessions meeting the at least one detection criterion. The control entity can then process the received detection report.

Furthermore, the corresponding control entity is provided which operates as discussed above or as discussed in further detail below. The control entity might be a new node in the network and works as an intelligent security control function, which makes sure that the security software is invoked only for selected data flows. These selected data flows are present in the detection profile. Based on the topology, the types of possible security threats and the security object, a very specific detection profile can be generated which is then used by the user plane entities to detect specific packet data sessions.

Furthermore a method is provided carried out at the user plane entity which is configured to handle the plurality of packet data sessions, wherein the user plane entity receives from the control entity configured to control the detection of a plurality of packet data sessions, a detection profile which includes at least one detection criterion indicating which of the plurality of packet data sessions in the user plane should be monitored for what type of security threats and for which security object. The user plane entity then monitors the packet data sessions handled in the user plane entity and determines that the at least one detection criterion is met for at least one of the plurality of packet data sessions, wherein a detection report is transmitted to the control entity, wherein the detection report indicates that the detection criterion is met for said at least one packet data session.

Furthermore, the corresponding user plane entity is provided operated as discussed above or as discussed in further detail below. Additionally a system is provided comprising the control entity and the user plane entity.

It is to be understood that the features mentioned above and features yet to be explained below can be used not only in the respective combinations indicated, but also in other combinations or in isolation without departing from the scope of the present invention. Features of the above-mentioned aspects and embodiments described below may be combined with each other in other embodiments unless explicitly mentioned otherwise.

BRIEF DESCRIPTION OF THE DRAWINGS

The foregoing and additional features and effects of the invention will become apparent from the following detailed description when read in conjunction with the accompanying drawings in which like reference numerals refer to like elements.

DETAILED DESCRIPTION

Figure 1:
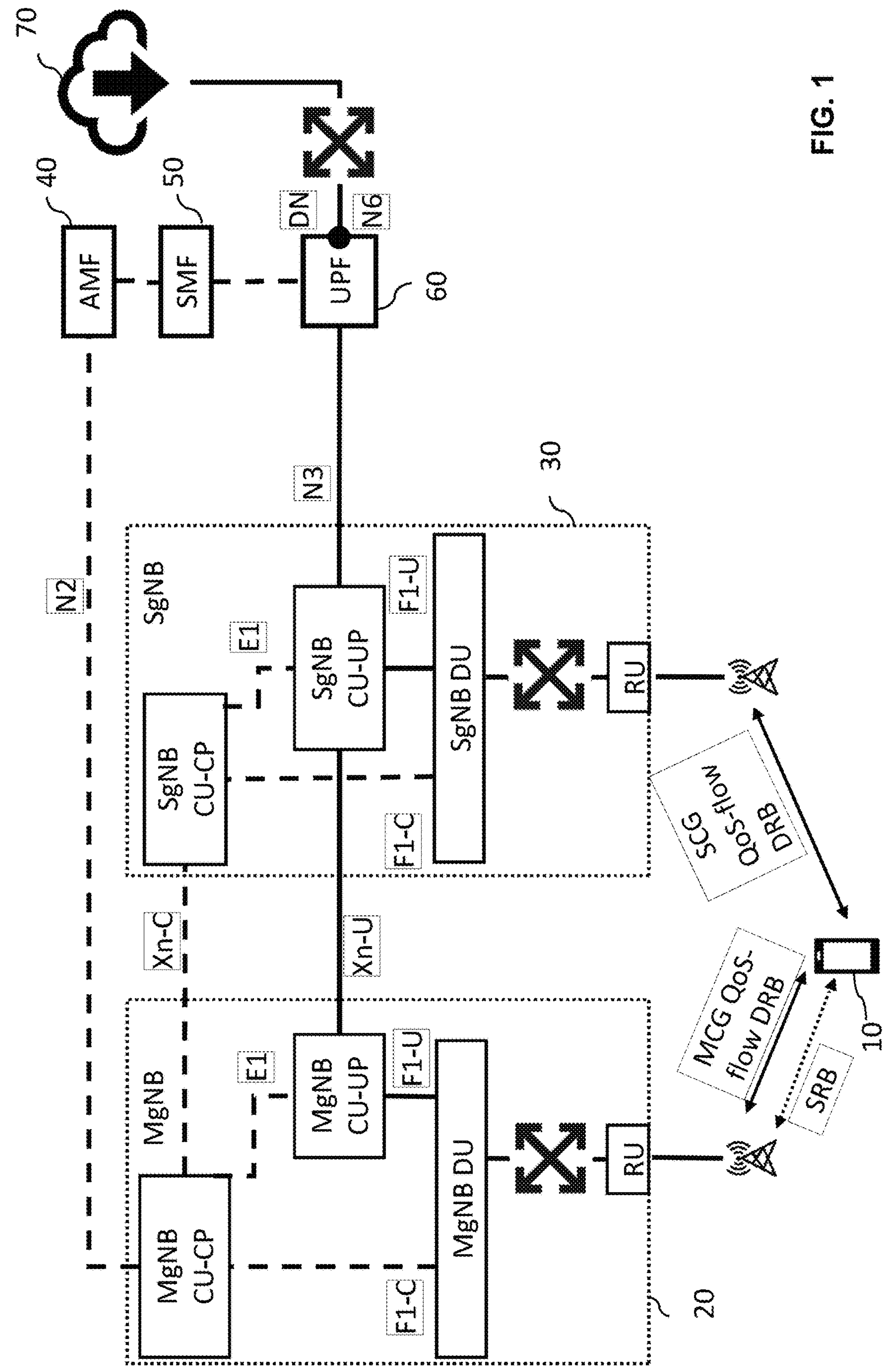
FIG. 1 shows a schematic view of an architecture when a UE connects to a radio access network for mobile broadband traffic using a dual connectivity as known in the art.
Figure 2:
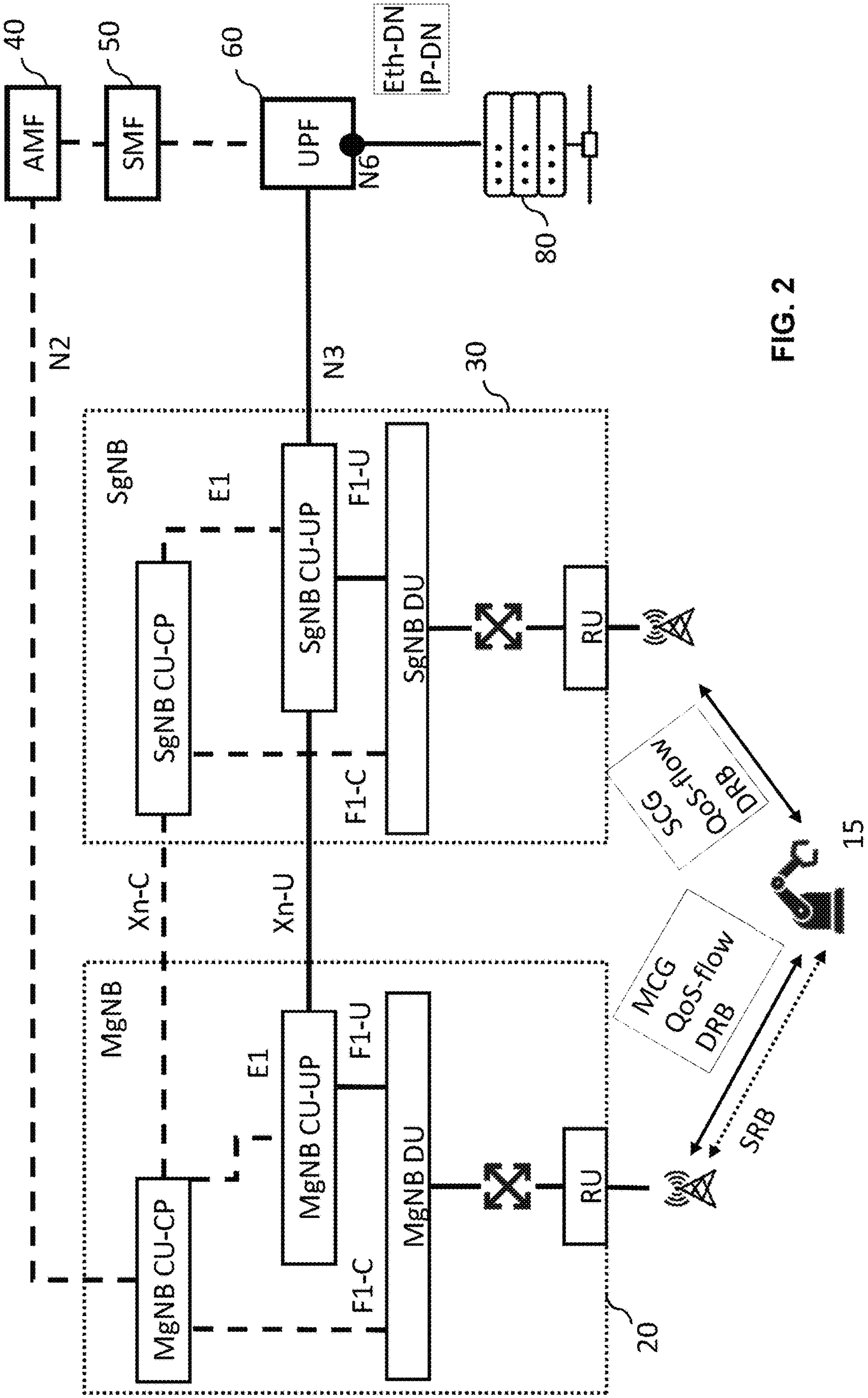
FIG. 2 shows a schematic view of an architecture when a device such as a robot connects to a non-public network as known in the art.
Figure 3:
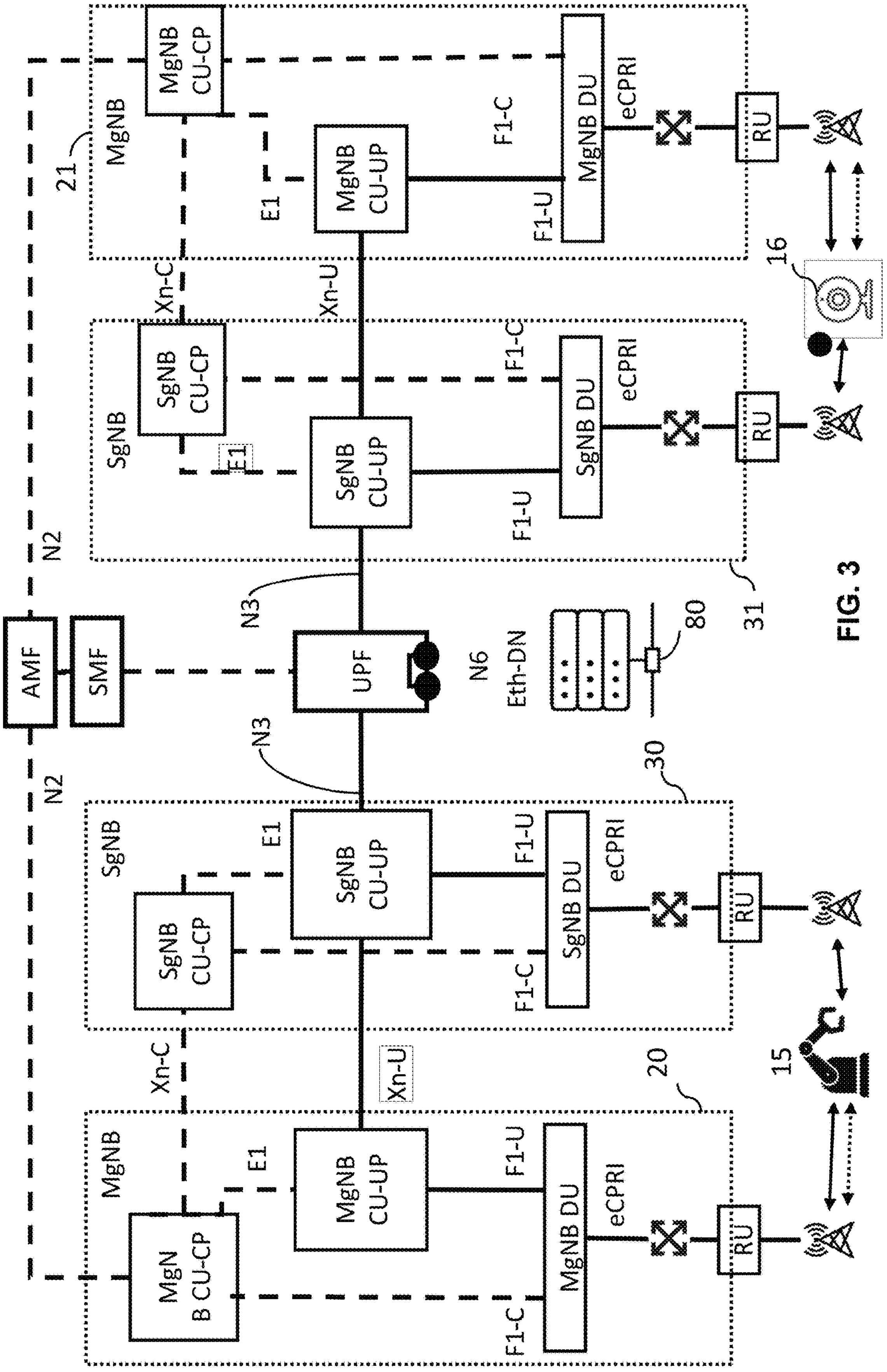
FIG. 3 shows a schematic view of an architecture in which two devices using a UE-to-UE communication scheme as known in the art.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

Within the context of the present application, the term "mobile entity" or "user equipment" (UE) refers to a device for instance used by a person (i.e. a user) for his or her personal communication. It can be a telephone type of device, for example a telephone or a Session Initiating Protocol (SIP) or Voice over IP (VOIP) phone, cellular telephone, a mobile station, cordless phone, or a personal digital assistant type of device like laptop, notebook, notepad, tablet equipped with a wireless data connection. The UE may also be associated with non-humans like animals, plants, or machines. A UE may be equipped with a SIM (Subscriber Identity Module) or electronic-SIM comprising unique identities such as IMSI (International Mobile Subscriber Identity), TMSI (Temporary Mobile Subscriber Identity), or GUTI (Globally Unique Temporary UE Identity) associated with the user using the UE. The presence of a SIM within a UE customizes the UE uniquely with a subscription of the user.

For the sake of clarity, it is noted that there is a difference but also a tight connection between a user and a subscriber.

A user gets access to a network by acquiring a subscription to the network and by that becomes a subscriber within the network. The network then recognizes the subscriber (e.g. by IMSI, TMSI or GUTI or the like) and uses the associated subscription to identify related subscriber data. A user is the actual user of the UE, and the user may also be the one owning the subscription, but the user and the owner of the subscription may also be different. E.g. the subscription owner may be the parent, and the actual user of the UE could be a child of that parent.

One part of the solution is to place security software inside the radio access network user plane processing nodes. Such a detection of security threats also works for encrypted traffic like https, which is the dominant share of traffic today without the need to decrypt and re-encrypt the traffic. This is shown and proven in many papers as by way of example in 1. Detection of HTTPS Malware Traffic from Střasák, F, Garcia, S. (2017), Bachelor Thesis
2. Malware Detection by HTTPS Traffic Analysis from Paul Prasse, Gerrit Gruben, Lukas Machlika, Tomas Pevny, Michal Sofka, Tobias Scheffer, University of Potsdam The advanced methods of security threat detection in encrypted traffic are less processing intense than the traditional decryption and re-encryption of the payload, but still it is consuming additional capacity.

Accordingly, as will be explained below the invention provides a method in a system for optimizing the use of scarce processing capacity in the radio access network nodes. This is obtained by adding a control entity, which plays the role of an intelligent security controller function. This control entity makes sure that the security software is invoked only for selected data flows.

Figure 4:
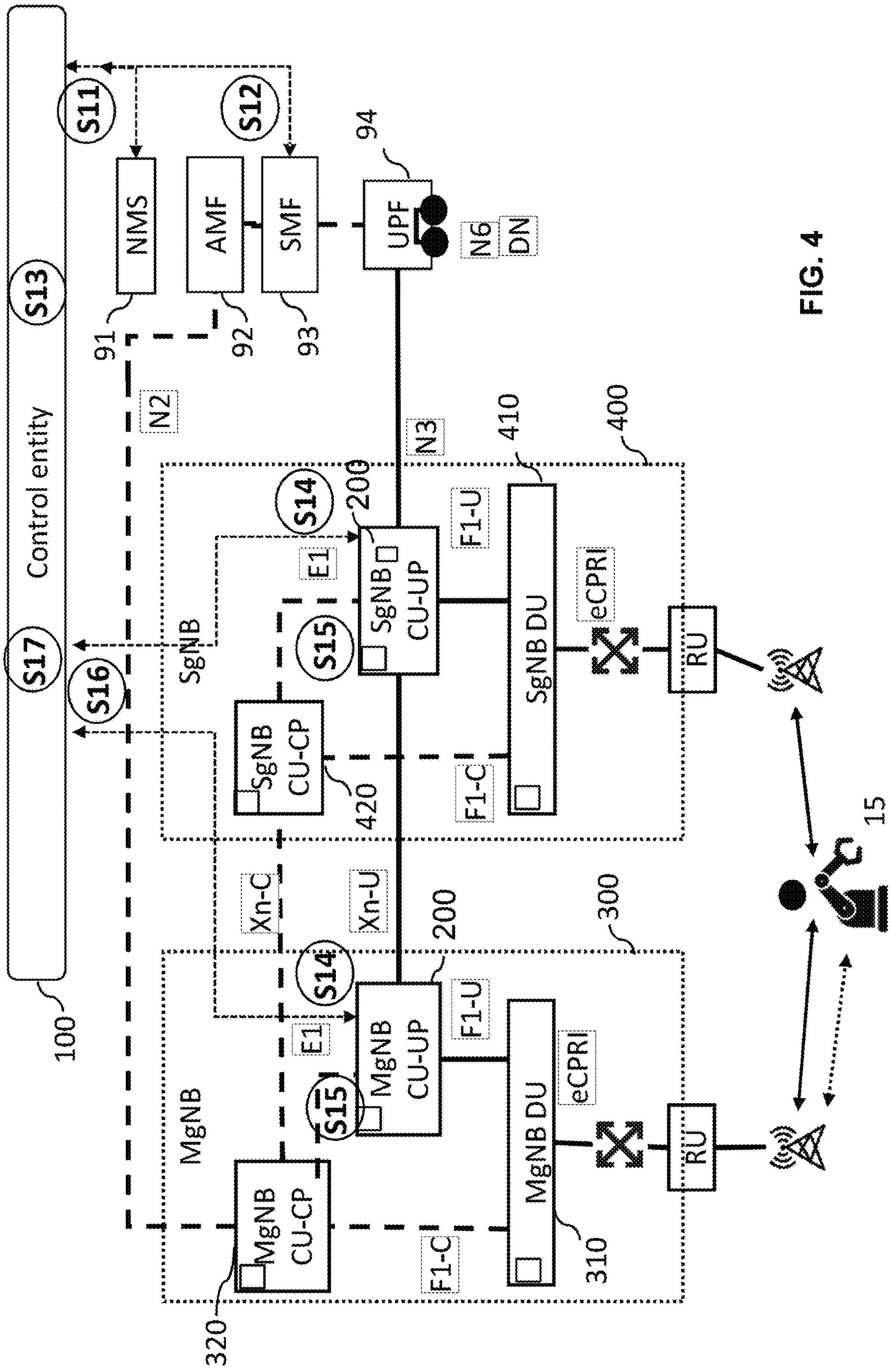
FIG. 4 shows a schematic architectural view a system including a control entity, which is configured to provide and control a monitoring of packet data sessions with a fine granularity.

FIG. 4 provides a schematic overview of the architecture in which a control entity 100 is provided which makes sure that any security software is invoked only for selected data flows. One important aspect is that information about the UEs and their data flows such as the PDU sessions or QoS flows from the core network, CN, and radio access network, RAN, is combined to identify which of the data flows or packet data sessions should be monitored. This decision is done in the control entity 100. This entity can be seen as a logical instance or function either as part of an existing node or function in the 3GPP or O-RAN architecture. It could be also implemented as a new node or function. A possible realization of such a control entity 100 can be as a stand-alone function or alternatively but not restricted to an "rAPP" in the O-RAN service management and orchestration, SMO, function. Referring to FIG. 4 in steps S11 and S12 an initialization and initial configuration of the control entity 100 is carried out. In this first initialization or initial configuration step the control entity 100 interacts with the network management system, NMS, 91 to learn the topology of the network and configuration information such as the packet core nodes, the connected radio access network nodes and their operation and maintenance addresses and the location etc. Accordingly, in this step the control entity is informed about the presence of the radio access node 300 with the centralized control plane entity 320, the user plane entity 200 with its distributed unit 310 and a radio access node 400 including corresponding centralized control plane entity 420, the user plane entity 200 and the distributed unit 410. Each radio access node is configured to receive and forward the packet data sessions to a user plane function 94. Furthermore, the presence and location of AMF 92 or SMF 93 is determined in this context.

The network configuration information contains by way of example information about the serving radio access nodes, here node 300 and 400 and the user plane entities 200. Furthermore the UE IP address assignment policies and the UE IP address ranges such as the IP addresses per domain name, DN, are determined, a possible network slice information, S-NSSAI, URSP, and location information is determined such as the cell identities, the geographic locations and the serving nodes.

In step S13 the detection profiles are generated. Here, the control entity creates the detection profiles. The detection profiles use as input the security policy defined by communication service providers, CSP. The detection profiles define what type of security threats the security software in the radio access network user plane should detect such as malware, intrusion, or denial of service, DoS, and on which objects. Different objects of security can exist. By way of example, the security policy might detect all traffic between machines in a certain defined geographical area using Ethernet type communication. Another example would be the detection of all traffic in a defined slice of the network. Further security objects or criteria could be used such as the PDU session type, the UE IP address ranges, the PDU session ID as an individual ID or ranges of session IDs, the S-NSSAI, the IAB (Integrated Access and Backhaul) node indication and an indication such as routing behind UE.

In step S14 the radio access network nodes are updated with the created detection profiles. The control entity 100 determines which of the radio access network nodes need to know which detection profile, by way of example based on a geographical or connectivity information and then sends the detection profiles to the affected radio nodes such as nodes 300 and 400, here especially to the user plane entities 200 shown in FIG. 4. The control entity 100 does not need to be aware about the UE connectivity details in the radio access network such as the dual connectivity use, bearer types, carrier aggregation configuration etc. In the examples shown the radio access network nodes use a dual connectivity use. It should be understood that the invention is not restricted to the use of two radio access network nodes, a single of the nodes such as node 300 may also be used without node 400.

Step S15 relates to the establishment or modification of the data packet sessions/data flow. During an establishment or modification of a data flow such as a PDU session or a QoS flow the nodes 200 compare the detection profile with their local information about the UE and its data flows. According to the received detection profile the most suited radio node, gNB/CU-UP, Centralized Unit-User Plane, takes the decision if the data flow requires detecting by a security software or not. Typically, if detection is considered necessary, the activation of the security software in the data flow will be the radio access node, centralized unit-user plane serving the N3 interface. In the embodiment as shown, a separation of control plane and user plane is carried out and each centralized unit, CU, comprises one or more distributed units such as units 310 or 410.

In step S16 any suspicious activity in the packet data session is reported. In case the security software detects suspicious activities or files in a monitored data flow the control entity 100 is informed about the observation with an event including available contextual information such as the UE identifier in the radio access network, the serving radio access network nodes, the serving core nodes, endpoint addresses which might be IP address or MAC, a domain name, DN, a data flow establishment time, or a detection timestamp.

In step S17 the reported event is further processed. Thus, after reception of the report, the reported event is evaluated in the control entity 100 and for example visualized to security experts for further analysis. It is also possible to take automated actions such as to isolate the device, route traffic to sandbox for monitoring or analysis or block a UE-to-UE communication and similar such further action may require additional operations by the control entity 100 to the traffic handling nodes 200.

Summarizing the invention allows a per data flow activation of additional security for selected UEs in the radio access network. This is obtained by combining knowledge from the core network and radio access network nodes in the logical entity named control entity 100. The control entity 100 provides the information necessary for the security activation to the involved radio access network nodes.

Figure 5:
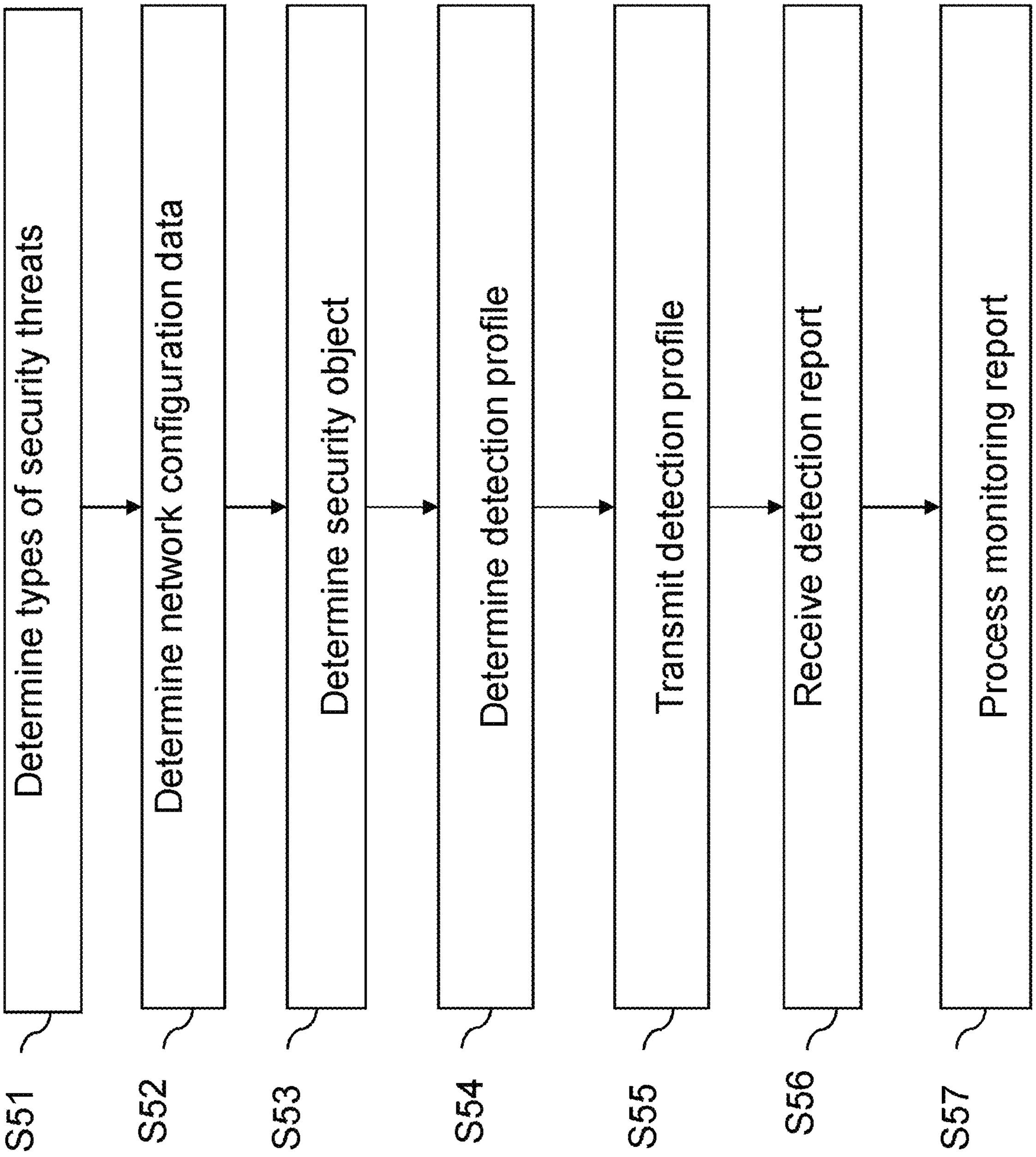
FIG. 5 shows a schematic view of a flowchart comprising the steps carried out by the control entity shown in FIG. 4.

In FIG. 5 some of the main steps carried out by the control entity 100 in the solution discussed above are shown in more detail. In step S51 the control entity 100 determines one or more types of the possible security threats to detect by way of example a malware, an intrusion or a denial of service. Furthermore, in step S52 network configuration data of the cellular network are determined by the control entity 100, wherein this network configuration data includes at least a topology of the cellular network. In step S53 security object is determined meaning which type of packet data sessions should be monitored such as sessions of a predefined PDU type or sessions having a certain IP address or address range, sessions having a certain session identifier etc. Step S54 a detection profile is determined based on the security threats to be detected, the security object and the network configuration data. The detection profile includes a detection criterion, which indicates which packet data sessions should be monitored for what type of security threats and for which security object. In step S55 the detection profile as generated is transmitted to the user plane nodes 200. When the user plane nodes detect a traffic meeting one of the detection criterions the nodes 200 transmit a detection report, which is received in step S56 by the control entity 100. This report reports the data packet session, which meets the detection criterion. In step S57 the detection report is further processed meaning that any countermeasures might be taken or the report is simply indicated to a user of the system.

Figure 6:
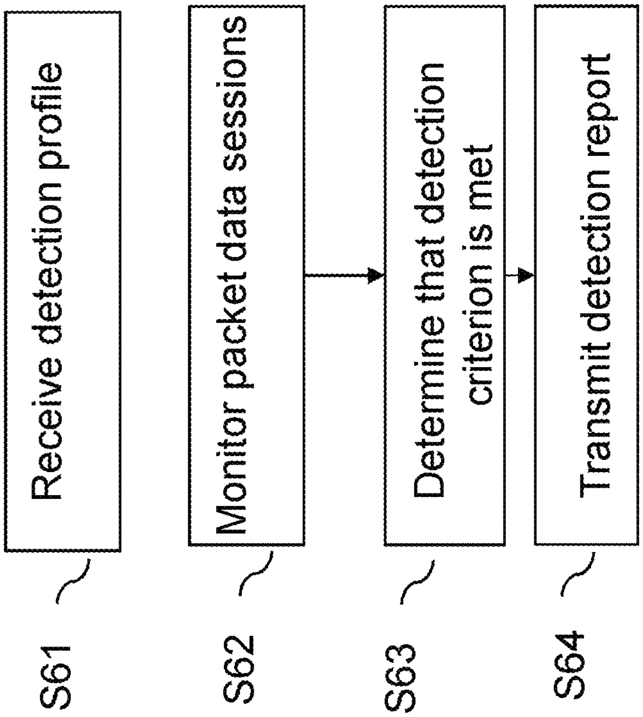
FIG. 6 shows a schematic view of a flowchart comprising the steps carried out at a user plane entity the architecture shown in FIG. 4.

FIG. 6 summarizes some of the steps carried out by the user plane entities shown in FIG. 4. The entity 200 receives the detection profile in step S61 and in step S62 the data packet handled by the user plane entity are monitored and in step S63 it may be determined that at least one of the packet data sessions from the monitored sessions meets at least one of the detection criterions mentioned in the detection profile. In this case, a detection report is transmitted to the control entity 100 in step S64.

In general the term determining used in the present context includes obtaining, receiving from another entity or actively retrieving the required piece of information from another entity or storage place.

Figure 7:
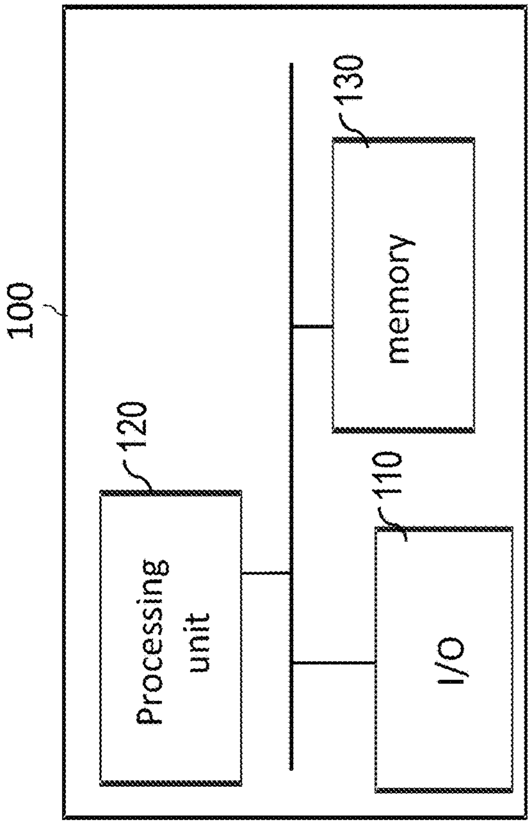
FIG. 7 shows a schematic architectural view of the control entity shown in FIG. 4.

FIG. 7 shows a schematic architectural view of the control entity 100, which is involved in the steps discussed in connection with FIG. 4. The control entity may be a stand-alone unit or may be implemented in any of the other nodes as indicated above. The control entity 100 comprises an interface 110, which is provided for transmitting control messages or any other data to other entities such as the involved radio access network nodes, which handle the user plane data. In the same way interface 110 is provided to receive messages such as the detection report from other entities. The entity 100 furthermore comprises a processing unit 120 which is responsible for the operation of the control entity 100. The processing unit 120 can comprise one or more processors and can carry out instructions stored on a memory 130, wherein the memory may include a read-only memory, a random access memory, a mass storage, a hard disk or the like or any other type of memory. The memory can furthermore include suitable program code to be executed by the processing unit 120 so as to implement the above-described functionalities in which the control entity 100 is involved.

Figure 8:
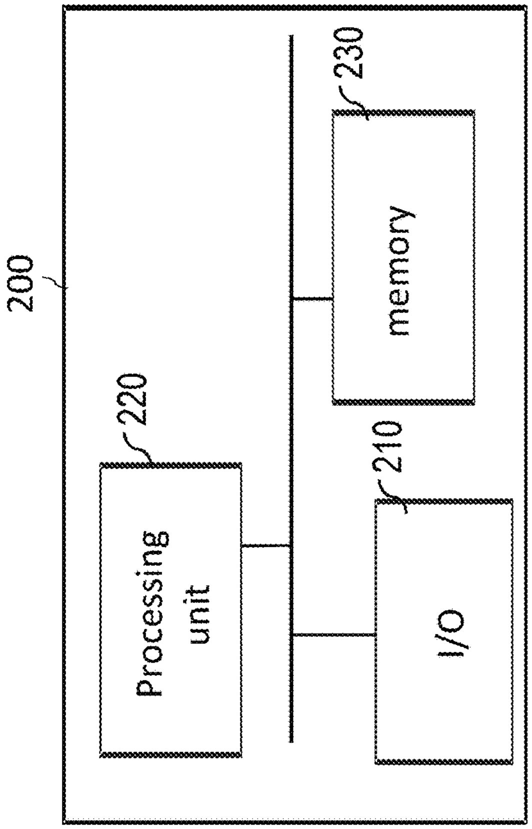
FIG. 8 shows a schematic architectural view of the user plane entity shown in FIG. 4.

FIG. 8 shows a schematic architectural view of a user plane entity 200 handling the packet data sessions and receiving the detection profile from control entity 100. The user plane entity 200 comprises an interface 210 which is provided for transmitting user data such as data packet sessions to other entities and is provided for receiving user data or control messages from other entities such as from other user plane nodes or from the control entity 100. The user plane entity 200 comprises a processing unit 220, which is responsible for the operation of the user plane entity 200. The processing unit 220 comprises one or more processors and can carry out instructions stored on a memory 230, wherein the memory may include a read-only memory, a random access memory, a mass storage, a hard disk, or the like. The memory 230 can furthermore include suitable program code to be executed by the processing unit 220 so as to implement the above described functionalities in which the user plane entity 200 is involved.

From the above said some general conclusions can be drawn:

As far as the control entity is concerned, the detection profile as determined by the control entity could request the user plane entities to only detect and monitor at least one data packet session from the plurality of packet data sessions where the at least one detection criterion is met without monitoring the packet data sessions from the plurality of packet data sessions where the detection criterion is not met.

Determining the network configuration data can mean to request topology information from a network management entity such as the NMS 91 shown in FIG. 4 and can include the accessing of a session management entity such as SMF 93 based on the requested topology information to request at least some of the network configuration data from the SMF. An example for the topology could be the packet core nodes, the connected radio access network nodes and their operating and maintenance addresses, the location of the different nodes.

When the network configuration data is determined it is possible to determine in general the available packet core network nodes, the serving radio access network nodes, an IP address assignment policy for a user equipment in the cellular network, an IP address range per domain name assigned in the cellular network, a network slice information of a new network slice of the cellular network, or geographical location data of service and nodes present in the cellular network.

When the security object is determined it is possible to determine the following pieces of information:

the packet data session of a specific or certain PDU type, the packet data session having a predefined IP address or an IP address in a predefined IP address range, the data packet session having a predefined session identifier, the packet data session having a predefined slice identifier, the packet data session having a "rooting behind UE" indicator, the packet data session having an Integrated Access and Backhaul, IAB indicator. The detection criterion may comprise the data packet session and the type of possible security threats.

When the detection profile is determined it is possible that it is determined which type of security threat is to be detected on which entity operating in the cellular network.

The received detection report received by the control entity 100 may contain the following pieces of information: which detection profile triggered the received detection report, which detection criterion was matched, an identifier of the user equipment involved in the packet data session, a serving radio access node handling the packet data session, a serving core network node, an address of an endpoint of the packet data session, a domain name, or a time indicator when the packet data session was established or detected.

Additionally the processing of the received detection profile can include actions such as the visualization of the detection report, the isolation of the user equipment involved in the at least one packet data and the rooting of the packets to a predefined destination or the blocking of data packets sent by the user equipment involved in the at least one packet data session or received from the user equipment involved in the packet data session. The last step may be initiated by the control entity and then finally carried out by the user plane entity 200.

The main advantage of the of the solution discussed above compared to the known solutions is that a processing capacity in the radio access network nodes is only used to monitor or secure selected data flows that have special security needs. Data flows of less interest or that are already subject of monitoring elsewhere in the user plane processing path can bypass the detection in the RAN and thus leave scarce RAN processing capacity to handle other traffic. By this the processing in the RAN nodes is optimized and leads to minimize power consumption or if a constant processing power is assumed the capacity can be used to process more data flows leading to increased node data flow processing capacity.

The invention claimed is:

1. A method carried out at a control entity configured to control a detection of plurality of packet data sessions present in a user plane of a cellular network, the method comprising:

determining one or more types of possible security threats, determining network configuration data of the cellular network including a topology of the cellular network, determining a security object to be applied to the plurality of packet data sessions, determining a detection profile based on the determined one or more types of possible security threats, the security object and the network configuration data, the detection profile including at least one detection criterion indicating which of the plurality packet data sessions in the user plane should be monitored for what types of security threats and for which security object, wherein the detection profile requests the user plane entities to only detect and monitor at least one packet data session from the plurality of packet data sessions where the at least one detection criterion is met without monitoring packet data sessions from the plurality of packet data sessions where the at least one detection criterion is not met, transmitting the detection profile, to user plane entities, in a radio access part of the cellular network, receiving a detection report, from at least one of the user plane entities generated in response to the transmitted detection profile, reporting at least one packet data session among the plurality of packet data sessions meeting the at least one detection criterion, and processing the received detection report.

2. The method of claim 1, wherein determining the network configuration data comprises requesting topology information from a network management entity of the cellular network and accessing a session management entity based on the requested topology information to request at least some of the network configuration data from the session management entity.

3. The method of claim 1, wherein determining the network configuration data comprises determining at least one of the following:

available packet core network nodes, serving radio access network nodes, an IP address assignment policy for a user equipment in the cellular network, an IP address range per domain name assigned in the cellular network, network slice information of a network slice of the cellular network, or geographic location data of cells and nodes present in the cellular network.

4. The method of claim 1, wherein the security object comprises the at least one packet data session of a predefined PDU type.

5. The method of claim 1, wherein the at least one detection criterion comprises the at least one packet data session and a type of possible security threats.

6. The method of claim 1, wherein the determining the security profile comprises determining which type of security threat is to be detected on which user plane entity operating in the cellular network.

7. The method of claim 1, wherein the received detection report comprises at least one of the following:

which detection profile triggered the received detection report, which detection criterion was matched, an identifier of a user equipment involved in the at least one packet data session, a serving radio access node handling the at least one packet data session, a serving core network node, an address of an endpoint of the at least one packet data session, a domain name, or a time indicator when the at least one packet data session was established or detected.

8. The method of claim 1, wherein the processing the received detection profile comprises at least one of the following:

visualizing the detection report, isolating a user equipment involved in the at least one packet data session, routing packets of the at least one packet data session to a predefined destination, or blocking packet data sessions sent to the user equipment involved in the at least one packet data session or received from the user equipment involved in the at least one packet data session.

9. The method of claim 1, wherein the security object comprises the at least one packet data session having a predefined IP address or an IP address in a predefined IP address range.

10. The method of claim 1, wherein the security object comprises the at least one packet data session having a predefined session identifier.

11. The method of claim 1, wherein the security object comprises the at least one packet data session having a predefined slice identifier.

12. The method of claim 1, wherein the security object comprises the at least one packet data session having a "routing behind UE" indicator.

13. The method of claim 1, wherein the security object comprises the at least one packet data session having an "Integrated Access and Backhaul" indicator.

14. A method carried out at a user plane entity configured to handle a plurality of packet data sessions, the method comprising:

receiving, from a control entity configured to control a detection of a plurality of packet data sessions, a detection profile including at least one detection criterion indicating which of the plurality of packet data sessions in the user plane should be monitored for what types of security threats and for which security object, wherein the detection profile requests the user plane entities to only detect and monitor at least one packet data session from the plurality of packet data sessions where the at least one detection criterion is met without monitoring packet data sessions from the plurality of packet data sessions where the at least one detection criterion is not met, monitoring the plurality of packet data sessions handled by the user plane entity, determining that the at least one detection criterion is met for at least one of the plurality of packet data sessions, and transmitting a detection report to the control entity, the detection report indicating that the at least one detection criterion is met for said at least one packet data session.

15. The method of claim 14, wherein the security object comprises at least one of the following pieces of information:

the at least one packet data session of a predefined PDU type, the at least one packet data session having a predefined IP address or an IP address in a predefined IP address range, or other transport network address, the at least one packet data session having a predefined session identifier, the at least one packet data session having a predefined slice identifier, the at least one packet data session having a "routing behind UE" indicator, or the at least one packet data session having an "Integrated and Access Backhaul" indicator.

16. The method of claim 14, wherein the transmitted detection report comprises at least one of the following:

an identifier of a user equipment involved in the at least one packet data session, a serving radio access node identifier handling the at least one packet data session, a serving core network node identifier, an address of an endpoint of the at least one packet data session, a domain name, or a time indicator when the at least one packet data session was established or detected.

17. A control entity configured to control a detection of plurality of packet data sessions present in a user plane of a cellular network, the control entity comprising at least one processing unit and a memory, the memory including instructions executable by the at least one processing unit, the control entity being configured to:

determine one or more types of security threats to be detected, determine network configuration data of the cellular network including a topology of the cellular network, determine a security object to be applied to the plurality of packet data sessions, determine a detection profile based on the determined one or more types of possible security threats, security object and the network configuration data, the detection profile including at least one detection criterion indicating which of the plurality packet data sessions in the user plane should be monitored for what types of security threats and for which security object, wherein the detection profile requests the user plane entities to only detect and monitor at least one packet data session from the plurality of packet data sessions where the at least one detection criterion is met without monitoring packet data sessions from the plurality of packet data sessions where the at least one detection criterion is not met, transmit the detection profile, to user plane entities, in a radio access part of the cellular network, receive a detection report, from at least one of the user plane entities generated in response to the transmitted detection profile, reporting at least one packet data session among the plurality of packet data sessions meeting the at least one detection criterion, and, process the received detection report.

* * * * *